United States Patent
Steller et al.

(10) Patent No.: US 8,307,932 B2
(45) Date of Patent: Nov. 13, 2012

(54) FRONT PART FOR A MOTOR VEHICLE BODY

(75) Inventors: Claus Steller, Gross-Gerau (DE); Matthias Stahl-Offergeld, Frankfurt am Main (DE); Gunther Heim, Lampertheim (DE); Viet-Hung Nguyen, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/959,318

(22) Filed: Dec. 2, 2010

(65) Prior Publication Data

US 2011/0187134 A1   Aug. 4, 2011

(30) Foreign Application Priority Data

Dec. 3, 2009   (DE) .................. 10 2009 056 841

(51) Int. Cl.
  *B60R 19/52*   (2006.01)
(52) U.S. Cl. ............... 180/68.1; 180/68.6; 293/115
(58) Field of Classification Search ............ 180/68.1, 180/68.4, 68.6; 293/115, 136; 296/187.03, 296/187.093
  See application file for complete search history.

(56) References Cited

U.S. PATENT DOCUMENTS

| | | | |
|---|---|---|---|
| 3,638,748 A | 2/1972 | Tixier | |
| 4,733,813 A | 3/1988 | Le Meau et al. | |
| 5,174,628 A | 12/1992 | Hayatsugu et al. | |
| 5,271,473 A | 12/1993 | Ikeda et al. | |
| 6,428,065 B2 | 8/2002 | Sato et al. | |
| 6,494,510 B2* | 12/2002 | Okamura et al. | 293/149 |
| 6,510,891 B2 | 1/2003 | Anderson et al. | |
| 7,360,822 B2* | 4/2008 | Carroll et al. | 296/187.03 |
| 7,399,013 B2* | 7/2008 | Lutke-Bexten et al. | 293/102 |
| 7,938,463 B2* | 5/2011 | Lee | 293/120 |
| 7,967,350 B2* | 6/2011 | Ginja et al. | 293/136 |
| 2004/0160071 A1 | 8/2004 | Suganuma et al. | |
| 2006/0082169 A1 | 4/2006 | Kuhne | |
| 2006/0197300 A1 | 9/2006 | Nakashima et al. | |
| 2009/0058142 A1 | 3/2009 | Park | |
| 2010/0127520 A1 | 5/2010 | Ginja et al. | |
| 2010/0244481 A1 | 9/2010 | Ohno et al. | |

FOREIGN PATENT DOCUMENTS

| | | |
|---|---|---|
| DE | 102004050435 A1 | 4/2006 |
| DE | 202006009967 U1 | 8/2006 |
| EP | 1138556 A2 | 10/2001 |
| EP | 1384629 A2 | 1/2004 |
| FR | 2840573 A1 | 12/2003 |
| FR | 2927033 A1 | 8/2009 |

(Continued)

OTHER PUBLICATIONS

British Patent Office, British Search Report for British Application No. 1020342.0, Mar. 17, 2011.

(Continued)

*Primary Examiner* — J. Allen Shriver, II
*Assistant Examiner* — James Triggs
(74) *Attorney, Agent, or Firm* — Ingrassia Fisher & Lorenz, P.C.

(57) ABSTRACT

A front part of a motor vehicle body is provided that includes, but is not limited to a radiator and a bumper support transversely extending in front of the radiator and an air passage aligned with the radiator and formed in the bumper support.

19 Claims, 3 Drawing Sheets

FOREIGN PATENT DOCUMENTS

| | | | |
|---|---|---|---|
| GB | 1313408 A | | 4/1973 |
| GB | 2428221 A | | 1/2007 |
| JP | 57172848 A | * | 10/1982 |
| JP | 62174935 A | | 7/1987 |
| WO | 2005049383 A1 | | 6/2005 |
| WO | 2008110708 A1 | | 9/2008 |
| WO | 2008110709 A2 | | 9/2008 |
| WO | 2008152257 A1 | | 12/2008 |

OTHER PUBLICATIONS

British Patent Office, British Search Report for British Application No. 1020385.9, Mar. 18, 2011.

German Patent Office, German Search Report for German Application No. 102009056841.7, Oct. 1, 2010.

* cited by examiner

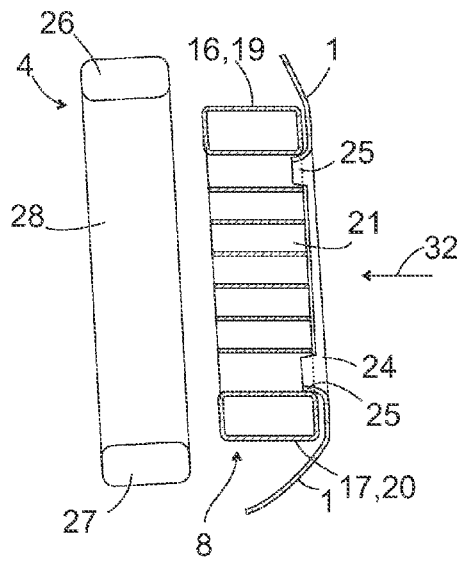
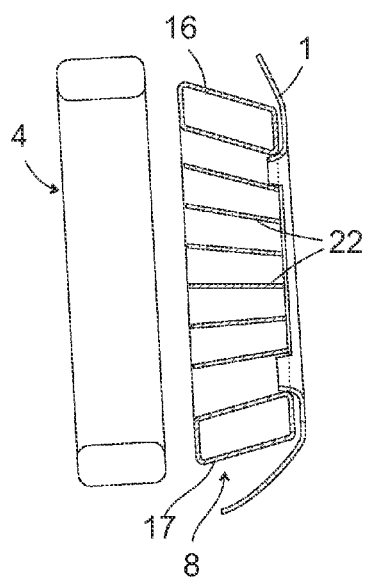
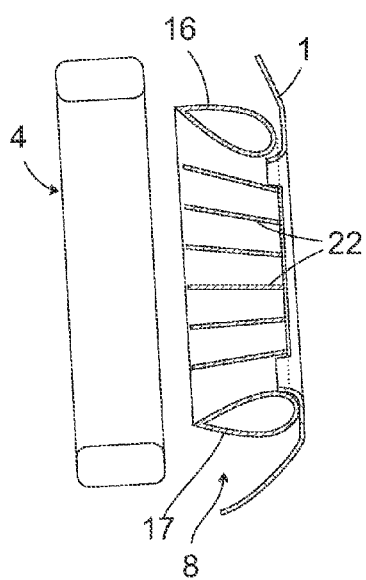
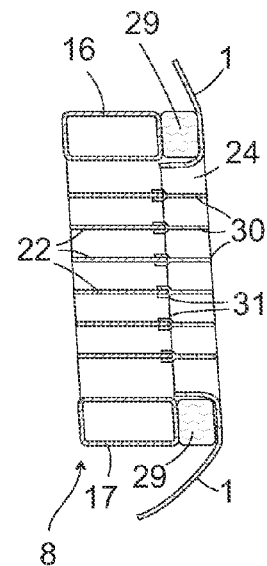

FRONT PART FOR A MOTOR VEHICLE BODY

CROSS-REFERENCE TO RELATED APPLICATION

This application claims priority to German Patent Application No. 102009056841.7, filed Dec. 3, 2009, which is incorporated herein by reference in its entirety.

TECHNICAL FIELD

The technical field relates to a front part of a motor vehicle body with a radiator and a bumper support transversely extending in front of the radiator.

BACKGROUND

A body front part is known for example from U.S. Pat. No. 5,271,473. With this conventional body front part the bumper support covers a large part of the free cross section of the radiator and affects the entry of fresh air. The air can reach the radiator only via openings of narrowly limited cross section above and below the cross member. The more compact the vehicle components are joined and the closer the radiator is consequently moved towards the bumper support, the more greatly is the fresh air entry to its middle region shadowed by the bumper support affected. The less said bumper support can contribute to the heat exchange performance of the radiator, the larger the cross-sectional area of the radiator as a whole has to be made, but which, especially with a compact body, is hardly possible. Arranging the radiator outside the slipstream of the bumper support is hardly possible, since a radiator relocated downwards is exposed to a high risk of damage and a radiator relocated upwards would impair the vision of the driver.

In view of the foregoing, it is at least one object to create a front part for a motor vehicle body where a high heat exchange performance of the radiator with compact dimensions can be realized although radiator and bumper support overlap each other vertically. In addition, other objects, desirable features and characteristics will become apparent from the subsequent summary and detailed description, and the appended claims, taken in conjunction with the accompanying drawings and this background.

SUMMARY

The at least one object, or other objects, desirable features and characteristics, is solved in that with a front part of a motor vehicle body with a radiator and a bumper support extending transversely in front of the radiator an air passage aligned with the radiator is formed in the bumper. This air passage allows effective fresh air supply to those parts of the radiator which, with a conventional, closed bumper support, would be located in its slipstream.

In order for the air passage not to affect the mechanical stability of the bumper support the bumper support is practically stiffened through a network of ribs crossing the air passage. These ribs should reduce the free cross section of the air passage as little as possible and are therefore preferentially aligned with narrow sides in driving direction located in front.

The bumper support preferentially comprises two side pieces which are each fastened to a body side member to the left and right of the radiator, and an upper and a lower frame which delimit the air passage at the top and bottom and each merge with the side pieces at a branching. In order to realize a large cross-sectional area of the air passage it can be practical that at least one of the frames extends in an arc about the air passage. Preferentially the lower frame projects further forward than the upper frame in order to first come in contact with a pedestrian in the event of a collision with said pedestrian and thus ensure that the pedestrian falls onto the hood from the top. For this purpose, the lower frame should preferentially run predominantly at a height of the lower thigh of an adult pedestrian. In order to achieve a high loading capacity with little material use the frames are preferentially hollow, be it with closed cross section or with an open cross section that is preferentially open to the back.

The body front part can have a bumper covering which covers the bumper support. The bumper support practically comprises an opening aligned with the air passage.

BRIEF DESCRIPTION OF THE DRAWINGS

The present invention will hereinafter be described in conjunction with the following drawing figures, wherein like numerals denote like elements, and:

FIG. 4 is a schematic section through a body front part;
FIG. 5 is a section according to a modified configuration analog to FIG. 4;
FIG. 6 is a further modification of the section of FIG. 4;
and
FIG. 7 is a schematic section through a transverse bumper support and a bumper covering.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
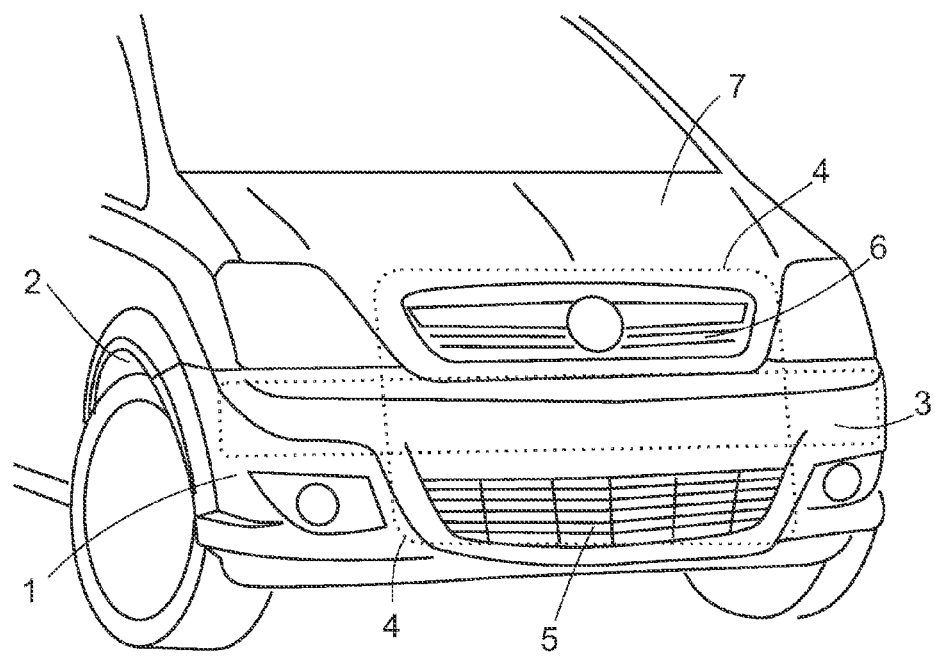
FIG. 1 is a conventional body front part.

FIG. 1 shows a schematic view of a conventional body front part. A bumper covering 1 of plastic takes up a lower region of the vehicle front and extends from a wheelhouse 2 to the one located opposite. Behind an upper, closed part of the bumper covering 1 there extends a bumper support 3 drawn in FIG. 1 as a dotted outline connected to carrying parts of the body. Again behind the bumper support 3, a radiator 4 is arranged. The bumper support 3 covers a central region of the radiator 4. In front of a region of the radiator 4 protruding in downward direction over the bumper support 3 a large-area air inlet opening 5 subdivided through webs or ribs is formed in the bumper covering 1. A second air inlet opening 6 is cleared in a front region of the engine hood 7 in front of an upper region of the radiator 4.

Figure 2:
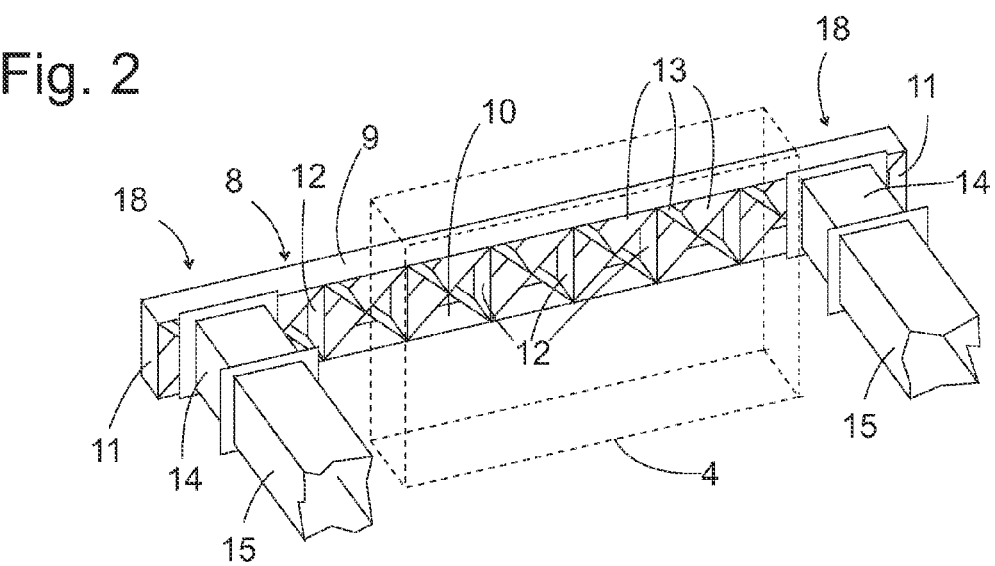
FIG. 2 is a schematic perspective view of a transverse bumper support according to a first embodiment.

FIG. 2 shows a bumper support 8 according to an embodiment in a schematic perspective view from the back, which, when it is transversely mounted in front of a radiator 4 in a body front part, does not obstruct the entry of fresh air to the radiator. The bumper 8 has a lattice structure with two steel bands 9, 10 each forming an upper and lower side, vertical struts 11, 12 connecting these steel bands at regular intervals, wherein the struts 11 laterally terminating the bumper 8 can be unitarily connected to the bands 9, 10, and diagonal strips 13 which, crossing each other in pairs, are fastened in corners of the quadrangles delimited by the bands 9, 10 and vertical struts 11, 12 located diagonally opposite each other. The bands 9, 10 and struts 11, 12, 13 are aligned with the front or with the back in each case with narrow sides of their cross section so that the bumper 8 at least in a central region extending in front of the radiator only has a minimal flow resistance.

The bands 9, 10 and struts 11, 12, 13 can be individually produced from metal and welded to one another or be fastened in another suitable manner; because it saves weight and production effort it is preferred to form the bumper support 8 unitarily of, preferentially fiber-reinforced, plastic. A combination of materials, for example metal for the bands 9, 10 and struts 11 and plastic for a grid unitarily uniting the struts 12, 13 can likewise be considered. The bumper support 8 is wider than the radiator 4 shown as broken outline in FIG. 2; two end sections 18 of the bumper support 8 which laterally protrude over the radiator 4 are fastened to side members 15 of the body via crash boxes 14, which in FIG. 2 are only shown in sections.

Figure 3:
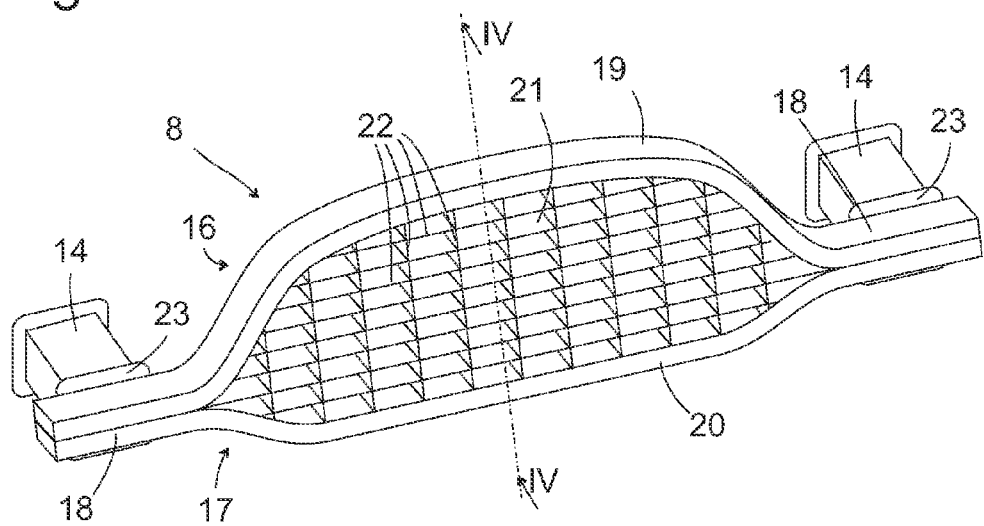
FIG. 3 is a transverse bumper support according to a second embodiment.

FIG. 3, in a perspective view from the front, shows a bumper support 8 according to a second embodiment. This bumper support 8 is joined together from an upper and a lower spar 16 and 17 respectively, which are manufactured from a hollow metal profile. At two end sections 18 these are connected to each other in a fixed manner and in each case are deflected arc-shaped to the top or to the bottom in a central section 19 or 20 in order to enclose a large-area opening 21. In the region of the opening 21 the bumper support 8 is stiffened through a multiplicity of struts 22 crossing one another. The struts 22 in this case are aligned horizontally and vertically but can also be oriented in other directions, they can form a honeycomb structure, or something else. Flanges 23 welded to both spars 16, 17 at the height of the end sections 18 serve for the fastening of crash boxes 14, which connect the bumper support 8 to side members that are not shown in FIG. 3.

Figure 3A:
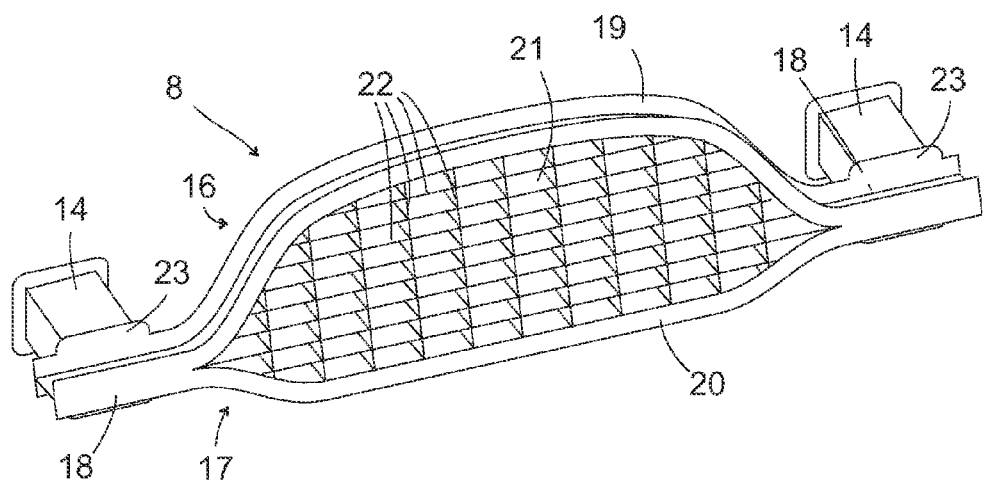
FIG. 3A is a modification of the bumper support of FIG. 3.

FIG. 3A shows a modification of the bumper support of FIG. 3. The spars 16, 17 and struts 22 are unitarily injection-molded from glass or carbon fiber-reinforced plastic. Since with this technology hollow spars with closed cross section are difficult to realize these are embodied with open cross section in this case: the central sections 19, 20 each have a C-shaped cross section open to the side facing away from the opening 21; in the end sections 18 the spars 16, 17 are merged into an H-profile. The flanges 23 for fastening to the crash boxes 14 in this case can likewise be unitarily realized with the spars 16, 17. Alternatively, the spars 16, 17 can also be designed as C-profiles open towards the radiator 4 and in the end sections 18 merged into an E-shaped cross section.

FIG. 4 shows a schematic cross section through the bumper support 8 of FIG. 3 and its surroundings in a body front part along a sectional plane running vertically and in driving direction designated IV-IV in FIG. 3. An arrow 32 designates the direction of the headwind. The closed cross section of the spars 16, 17 designed as hollow profiles is clearly visible here. A bumper covering 1 unitarily deep-drawn from plastic extends over the front sides of the spars 16, 17 and comprises an opening 24 overlapping with the opening 21 of the bumper support 8. Marginal regions 25 of the bumper covering 1 bent over to the inside on the margins of the opening 24 can engage in the opening 21 in order to positively support the bumper covering 1.

More additionally shown by the section of FIG. 4, the central section 20 of the lower spar 17 protrudes slightly further to the front than the central section 19 of the upper spar 16. The opening 21 is approximately located at knee height of an adult pedestrian. In that during an accident the lower spar 17 contacts the lower thigh of the pedestrian first, the pedestrian's legs are knocked away from under the trunk; the pedestrian highly probably falls onto the engine hood of the vehicle.

The height of the opening 21 is shorter than that of the radiator 4. Upper and lower marginal regions of the radiator 4 are therefore not directly subjected to an air stream horizontally passing through the opening 21. However, this restricts the efficiency of the radiator 4 marginally at most, particularly if the upper and lower marginal regions of the radiator are formed by an upper or a lower water box 26, 27, whose contribution to the heat exchange performance relative to the cross-sectional area is substantially less than that of a radiator core 28 extending between them. Obviously, the water boxes of the radiator 4 can alternatively be also arranged laterally of the radiator core 28.

If the extension of the opening 21 in the vertical is significantly less than that of the radiator core 28 to be subjected to onflow, a structure of the bumper support 8 shown in FIG. 5 in cross section can be considered. The horizontal struts 22 in this case do not run parallel but are fanned out towards the back in order to evenly distribute the air stream entering via the opening 21 over the radiator core 28. Here, the cross section of the spars 16, 17 in adaptation to the orientation of the struts 22 is distorted into a parallelogram. A cross section that tapers towards the back similar to a triangle or an aerodynamically particularly favorable cross section rounded off towards the opening 21, more preferably a drop-shaped cross section as shown in FIG. 6, would also be conceivable. In a similar manner, the vertical struts 22 could also be fanned out towards the back in order to evenly distribute the air stream passing through the opening 21 over a radiator 4 which is wider than the opening 21.

FIG. 7 shows a section through the bumper support 8 and a bumper covering 1 according to a further embodiment. Here, the struts 22 are shown in parallel but it is to be understood that, if necessary, these could also be arranged fan-like as shown in FIG. 5. Between the two spars 16, 17 of the bumper support 8 and the bumper covering 1 a buffer layer 29 each of a foam material yielding in the event of a collision with a pedestrian is arranged. The bumper covering 1 is also provided with ribs 30 crossing its opening 24, which like the rest of the bumper covering 1 consist of plastic. These ribs 30 yield as easily as the regions of the bumper covering 1 above and below the opening 24 backed by the buffer layers 29 in the event of a collision with a pedestrian. The ribs 30 can be supported on the struts 22 of the bumper support 8 in that tabs 31 molded onto the ribs 30 can be fitted onto the struts 22.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:
1. A front part of a motor vehicle body, comprising:
a first and second body side member;
a radiator;
a bumper support extending transversely in front of the radiator, the bumper support including;
an air passage formed in the bumper support that is aligned with the radiator;

an upper frame having a closed cross section coupled to the first and second body side member and extending in a central section in an arc toward a top of the air passage; and a lower frame having a closed cross section coupled to the first and second body side member and extending in a central section in an arc toward a bottom of the air passage; and wherein, the arc in the upper frame and the arc in the lower frame delimit the air passage and merge with side pieces at a branching to fasten to the first and second body side member.

2. The front part according to claim 1, further comprising a plurality of struts crossing the air passage and adapted to stiffen the bumper support.

3. The front part according to claim 2, wherein the plurality of struts are aligned with narrow sides in a driving direction located at a front.

4. The front part according to claim 1, wherein the lower frame projects forward to a greater extent than the upper frame.

5. The front part according to claim 1, wherein the lower frame is located at least predominantly at a height of a lower thigh of an adult pedestrian.

6. The front part according to claim 1, wherein the upper frame and the lower frame are hollow.

7. The front part according to claim 1, wherein the bumper support is at least partially formed of a plastic.

8. The front part according to claim 1, wherein the bumper support is at least partially formed of a fiber-reinforced plastic.

9. The front part according to claim 2, wherein the plurality of struts are formed in a single piece of plastic.

10. The front part according to claim 1, further comprising a bumper covering comprising an opening aligned with the air passage.

11. A front part of a motor vehicle body, comprising:
a first and second body side member;
a radiator;
a bumper support extending transversely in front of the radiator, the bumper support including:
an air passage formed in the bumper support that is aligned with the radiator;
an upper frame having a closed cross section coupled to the first and second body side member and extending in a central section in an arc toward a top of the air passage; and
a lower frame having an open cross section coupled to the first and second body side member and extending in a central section in an arc toward a bottom of the air passage and; and
wherein, the arc in the upper frame and the arc in the lower frame delimit the air passage and the merge with side pieces at a branching to fasten to the first and second body side member.

12. The front part according to claim 11, further comprising a plurality of horizontal struts and vertical struts crossing the air passage and adapted to stiffen the bumper support.

13. The front part according to claim 12, wherein the plurality of horizontal struts crossing the air passage fan out toward the back to distribute an air stream over the radiator.

14. The front part according to claim 11, wherein the lower frame projects forward to a greater extent than the upper frame.

15. A front part of a motor vehicle body, comprising:
a first and second body side member;
a radiator;
a bumper support extending transversely in front of the radiator, the bumper support including:
an air passage formed in the bumper support that is aligned with the radiator;
an upper frame having a closed cross section coupled to the first and second body side member and extending in a central section in an arc toward a top of the air passage; and
a lower frame having a closed cross section coupled to the first and second body side member and extending in a central section in an arc toward a bottom of the air passage, the lower frame projecting forward to a greater extent than the upper frame; and
wherein, the arc in the upper frame and the arc in the lower frame delimit the air passage and merge with side pieces at a branching to fasten to the first and second body side member.

16. The front part according to claim 15, further comprising a plurality of horizontal struts and vertical struts crossing the air passage and adapted to stiffen the bumper support.

17. The front part according to claim 2, further comprising a plurality of horizontal struts and vertical struts crossing the air passage and adapted to stiffen the bumper support.

18. The front part according to claim 17, wherein the plurality of horizontal struts crossing the air passage fan out toward the back to distribute an air stream over the radiator.

19. The front part according to claim 16, wherein the plurality of horizontal struts crossing the air passage fan out toward the back to distribute an air stream over the radiator.

* * * * *